(12) United States Patent
Misaki

(10) Patent No.: US 10,013,120 B2
(45) Date of Patent: Jul. 3, 2018

(54) TOUCH PANEL AND MANUFACTURING METHOD FOR TOUCH PANEL

(75) Inventor: Katsunori Misaki, Yonago (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 632 days.

(21) Appl. No.: 14/241,235

(22) PCT Filed: Aug. 29, 2012

(86) PCT No.: PCT/JP2012/071870
§ 371 (c)(1),
(2), (4) Date: Feb. 26, 2014

(87) PCT Pub. No.: WO2013/031847
PCT Pub. Date: Mar. 7, 2013

(65) Prior Publication Data
US 2014/0211111 A1    Jul. 31, 2014

(30) Foreign Application Priority Data
Sep. 2, 2011 (JP) .................................. 2011-191358

(51) Int. Cl.
*G06F 3/044* (2006.01)
*G06F 3/041* (2006.01)

(52) U.S. Cl.
CPC ............. *G06F 3/044* (2013.01); *G06F 3/041* (2013.01); *G06F 2203/04103* (2013.01); *G06F 2203/04111* (2013.01); *Y10T 29/49117* (2015.01)

(58) Field of Classification Search
CPC combination set(s) only.
See application file for complete search history.

(56) References Cited

U.S. PATENT DOCUMENTS

| 6,507,337 B1 | 1/2003 | Sato et al. |
| 2008/0309635 A1 | 12/2008 | Matsuo |
| 2010/0220076 A1* | 9/2010 | Nagata .................... G06F 3/044 345/174 |

(Continued)

FOREIGN PATENT DOCUMENTS

| JP | H5-267701 A | 10/1993 |
| JP | 6-252462 A | 9/1994 |

(Continued)

*Primary Examiner* — Robin Mishler
(74) *Attorney, Agent, or Firm* — Chen Yoshimura LLP

(57) ABSTRACT

The objective of the present invention is to achieve a manufacturing method that, in a capacitive touch panel, prevents the occurrence of residue in an electrode film caused by an etching defect for a touch panel in which electrode patterns are difficult to recognize. The manufacturing method for the touch panel includes: an electrode formation step for forming, upon an insulating substrate (10), first electrodes (11) and second electrodes (12) that extend in mutually intersecting directions; an insulating film formation step for forming insulating films (16) which cover portions of the insulating substrate (10), the first electrodes (11), and the second electrodes (12); and a bridge formation step for forming bridges (17) that connect neighboring second electrodes (12) together over the insulating films (16). In addition, before the bridge formation step, a surface treatment step for etching the surface of the first electrodes (11) and the second electrodes (12) is performed one or more times.

7 Claims, 17 Drawing Sheets

(56) References Cited

U.S. PATENT DOCUMENTS

2011/0254804 A1* 10/2011 Kuo ..................... G06F 3/0418
                                                    345/174
2013/0181944 A1* 7/2013 Lee ....................... G06F 3/044
                                                    345/174

FOREIGN PATENT DOCUMENTS

| JP | 2000-085051 A | 3/2000 |
| JP | 2008-310550 A | 12/2008 |
| JP | 2010-139600 A | 6/2010 |

* cited by examiner

TOUCH PANEL AND MANUFACTURING METHOD FOR TOUCH PANEL

TECHNICAL FIELD

The present invention relates to a capacitive type touch panel and a manufacturing method for this touch panel.

BACKGROUND ART

Capacitive type touch panels have recently become popular due having a high degree of practical use such as being capable of multi-position detection.

Japanese Patent Application Laid-Open Publication No. 2008-310550 discloses a touch panel (capacitive input device) in which first and second electrode patterns are formed on the same plane so as to extend in respective directions that intersect. In this touch panel, at an intersection between the first and second electrode patterns, one set of electrode patterns is connected and the other set of electrode patterns is disconnected. An interlayer insulating film is formed in this intersection, and on this interlayer insulating film, a bridge (relay electrode) connecting together the disconnected electrode patterns is formed.

Japanese Patent Application Laid-Open Publication No. H5-267701 discloses a patterning method for a tin oxide transparent electrode film in which it is possible to completely remove incompletely etched portions that occur when etching tin oxide transparent electrode films. Specifically, after patterning the tin oxide transparent electrode film by etching, this is soaked in an ammonium hydrogen fluoride solution while being agitated.

SUMMARY OF THE INVENTION

Because the touch panel is in use while stacked onto a display device, it is preferable that the touch panel have a high transparency such that the electrode patterns and the like are difficult to see by the user. With the configuration of the touch panel disclosed in Japanese Patent Application Laid-Open Publication No. 2008-310550, the first and second electrode patterns are formed in the same plane, and thus, there is little difference in reflectance between the first and second electrode patterns, and thus, the electrode patterns are difficult to see.

However, when forming relay electrodes connecting the disconnected electrode patterns to each other, residue from the transparent electrode film that occurs due to etching defects sometimes remains on the electrode patterns. This residue results in the problem that the electrode patterns are seen with ease by the user.

If the method disclosed in Japanese Patent Application Laid-Open Publication No. H5-267701 is applied to the above-mentioned touch panel, there is a possibility that the touch panel functionality is diminished due to the electrode pattern, in addition to the residue (left over from etching) of the transparent electrode film, being etched.

An object of the present invention is to provide a touch panel configuration that prevents the occurrence of residue from the electrode film due to etching defects in a capacitive type touch panel, thereby resulting in electrode patterns that are difficult to see, and a manufacturing method for this touch panel.

A manufacturing method for a touch panel according to an embodiment of the present invention includes: forming first electrode sections and second electrode sections on an insulating substrate, the first electrode sections being connected to each other by a connecting portion in a first direction; forming an insulating film that covers the connecting portion between the first electrode sections; and forming a bridge to connect the adjacent second electrode sections over the insulating film in a second direction intersecting with the first direction. A surface treatment step of etching surfaces of the first electrode sections and second electrode sections is performed one or more times before the step of forming the bridges.

Also, a touch panel according to an embodiment of the present invention includes: an insulating substrate; a first electrode extending in one direction and including first electrode sections and connecting portions that connect the adjacent first electrode sections, the first electrodes being formed on the insulating substrate; a second electrode formed on the insulating substrate and extending in a direction that intersects with the first electrode, the second electrode including second electrode sections; and an insulating film that covers the connecting portion, wherein the second electrode has a bridge connecting the adjacent second electrode sections over the insulating film. Portions of the first and second electrodes in contact with the insulating film are greater in thickness than portions not in contact with the insulating film.

According to the present invention, a touch panel with electrode patterns that are difficult to see is obtained by preventing the appearance of electrode film residue due to etching defects in a capacitive touch panel.

DETAILED DESCRIPTION OF EMBODIMENTS

Figure 1:
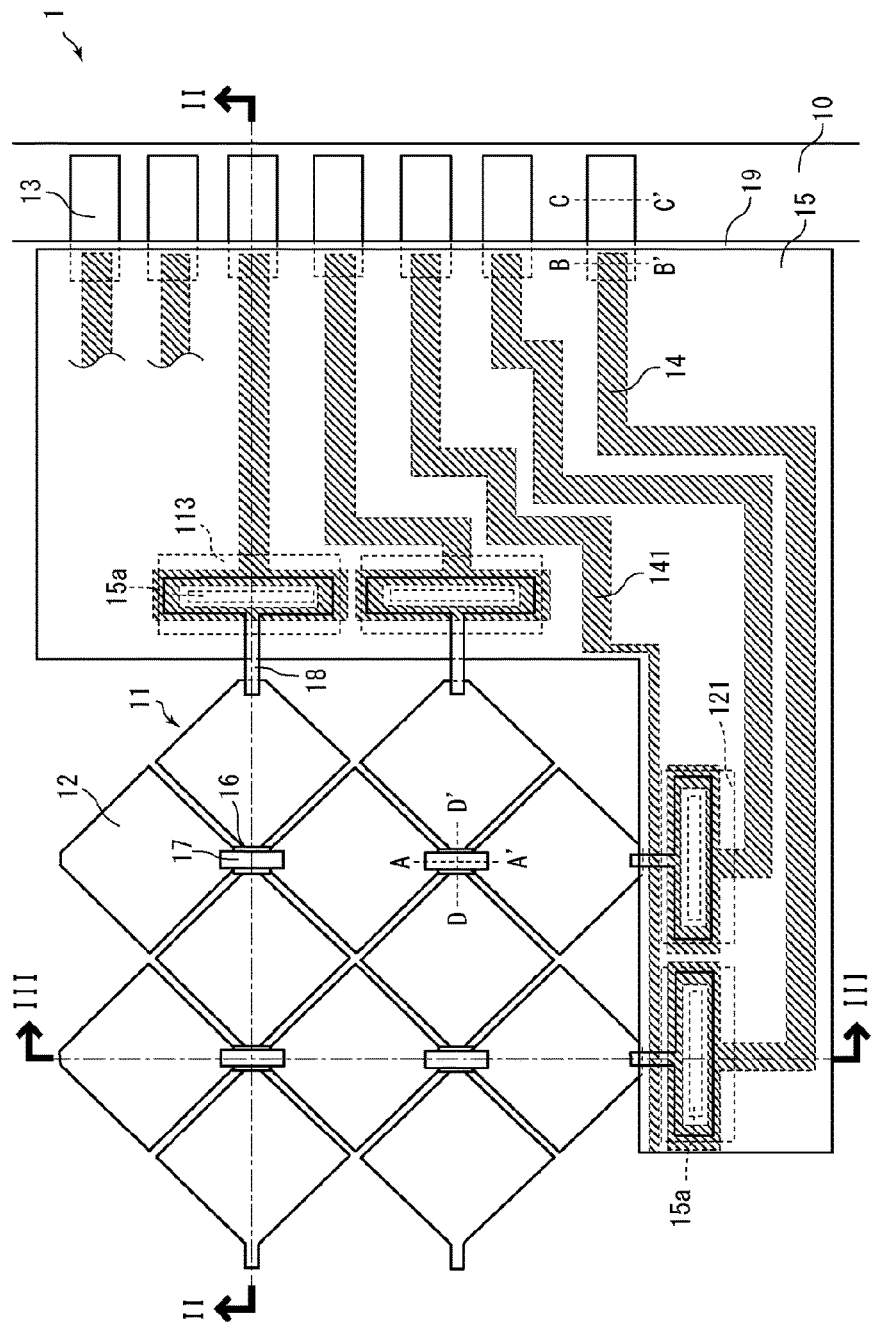
FIG. 1 is a plan view that schematically shows a touch panel configuration according to Embodiment 1 of the present invention.

A manufacturing method for a touch panel of one embodiment of the present invention includes a step of forming electrodes in which first electrodes and second electrodes that respectively extend in intersecting directions are formed on an insulating substrate, a step of forming insulating films covering a portion of the insulating substrate, the first electrodes, and the second electrodes, and a step of forming bridges that connect adjacent second electrodes over the insulating films. Before the step of forming the bridges, a step of treating surfaces to etch surfaces of the first electrodes and second electrodes is performed one or more times (Example 1 of manufacturing method).

In the process of manufacturing the touch panel, if the surfaces of the first electrodes and second electrodes are exposed to air or moisture, an oxygen-rich layer is sometimes formed. If a bridge is formed over an oxygen-rich layer, then a semicrystalline film is formed. This semicrystalline film is difficult to etch compared to an amorphous film, which is a cause for electrode film residue remaining.

In the manufacturing method for a touch panel according to the Example 1, the step of treating the surfaces in which the first electrodes and second electrodes are etched is included prior to the step of forming the bridges. As a result, the oxygen-rich layer is removed from the surfaces of the first electrodes and second electrodes. As a result, the formation of a semicrystalline film is prevented. Thus, the occurrence of electrode film residue can be prevented, thus making it difficult to see the electrode patterns.

In Example 1, the etching type may be selected from a group including a highly alkaline solution treatment, hydrofluoric acid treatment, chlorine gas dry etching, and a combination thereof (Example 2 of the manufacturing method).

In Example 1 or 2, one of the steps of treating surfaces can be performed in succession with the step of forming the insulating film (Example 3 of the manufacturing method).

In any one of Examples 1 to 3, it is preferable that one of the steps of treating the surfaces be performed simultaneously with the step of forming the insulating film (Example 4 of the manufacturing method).

According to the Examples above, the manufacturing process can be simplified.

Any of Examples 1 to 4 may further include a step of forming terminals on the insulating substrate, and a step of forming wiring lines that connect the first and second electrodes to the terminals. In this case, the insulating film formed by the step of forming the insulating film covers a portion of the wiring lines and the terminals in addition to the insulating substrate, the first electrodes, and the second electrodes, and in the step of treating surfaces, surfaces of the terminals are etched in addition to the surfaces of the first electrodes and second electrodes (Example 5 of the manufacturing method).

In Example 5, one of the steps of treating surfaces can be performed in succession with the step of forming the wiring lines (Example 6 of the manufacturing method).

In Example 5 to 6, it is preferable that one of the steps of treating the surfaces be performed simultaneously with the step of forming the wiring lines (Example 7 of the manufacturing method).

According to the Examples above, the manufacturing process can be simplified.

In any one of Examples 5 to 7, it is preferable that the step of forming the electrodes and the step of forming the terminals be performed simultaneously (Example 8 of the manufacturing method).

According to the Example above, the manufacturing process can be simplified.

In any one of Examples 1 to 8, it is preferable that a step of forming a reflectance adjusting layer including two or more layered insulating films with differing indices of refraction on the insulating substrate be further included (Example 9 of the manufacturing method).

According to this example, the difference in reflectance between portions where the first electrodes or second electrodes are formed and portions where neither the first electrode nor second electrodes are formed is adjusted by the reflectance adjusting layer. Thus, the electrode patterns become more difficult to see.

A touch panel according to an embodiment of the present invention includes: an insulating substrate; a first electrode extending in one direction and including first electrode sections and connecting portions that connect the adjacent first electrode sections, the first electrode being formed on the insulating substrate; a second electrode formed on the insulating substrate and extending in a direction that intersects with the first electrode, the second electrode including second electrode sections; and an insulating film that covers the connecting portion, the second electrode having a bridge connecting the adjacent second electrode sections over the insulating film. Portions of the first and second electrodes in contact with the insulating film are greater in thickness than portions not in contact with the insulating film (first configuration).

If the thickness of the first electrodes and second electrodes is decreased, the transparency thereof increases, thus making the electrode patterns difficult to see. On the other hand, if the cross-sectional area is decreased, electrical resistance increases, which reduces the sensitivity of the touch panel.

According to the first configuration, portions of the first and second electrodes in contact with the insulating film are formed to be greater in thickness. The connecting portions are covered by the insulating film. In other words, the connecting portions are made selectively thick. As a result, an increase in electrical resistance is mitigated while having other portions of the first and second electrodes formed to be thin, thus allowing the electrode patterns to be difficult to see.

In the first configuration, the insulating film may also cover at least either of respective portions of the first electrode sections and respective portions of the second electrode sections (second configuration).

In the first or second configuration, terminals formed on the insulating substrate; and wiring lines connecting the first and second electrodes to the terminals may be further included, the terminals having portions of differing thicknesses (third configuration).

A touch panel according to another embodiment of the present invention includes: an insulating substrate; a first electrode extending in one direction and including first electrode sections and connecting portions that connect the adjacent first electrode sections, the first electrode being formed on the insulating substrate; a second electrode formed on the insulating substrate and extending in a direction that intersects with the first electrode, the second electrode including second electrode sections; an insulating film that covers the connecting portion; terminals formed on the insulating substrate; and wiring lines connecting the first and second electrodes to the terminals. The second electrode has a bridge that connects the adjacent second electrode sections, and the terminals have portions of differing thicknesses (fourth configuration).

In the third or fourth configuration, portions of the terminals respectively in contact with the wiring lines may be greater in thickness than portions not in contact with the wiring lines (fifth configuration).

In any of the third to fifth configurations, it is preferable that the first and second electrodes be made of the same material as the terminals (sixth configuration).

According to this configuration, the manufacturing process can be simplified.

In any of the first to sixth configurations, the first and second electrodes are made of a material selected from among a group including indium tin oxide (ITO) and indium zinc oxide (IZO) (seventh configuration).

In any of the first to seventh configurations, it is preferable that a reflectance adjusting layer formed on the insulating substrate and including two or more layered insulating films of differing indices of refraction be further included (eighth configuration).

According to this configuration, the difference in reflectance between portions where the first electrodes or second electrodes are formed and portions where neither the first electrodes nor second electrodes are formed is adjusted by the reflectance adjusting layer. Thus, the electrode patterns become more difficult to see.

<Embodiments>

Embodiments of the present invention will be described in detail below with reference to the drawings. Portions in the drawings that are the same or similar are assigned the same reference characters and descriptions thereof will not be repeated. For ease of description, drawings referred to below show simplified or schematic configurations, and some of the components are omitted. Components shown in the drawings are not necessarily to scale.

<Embodiment 1>

A schematic configuration of a touch panel 1 according to Embodiment 1 of the present invention will be described with reference to FIGS. 1 to 5.

Figure 2:
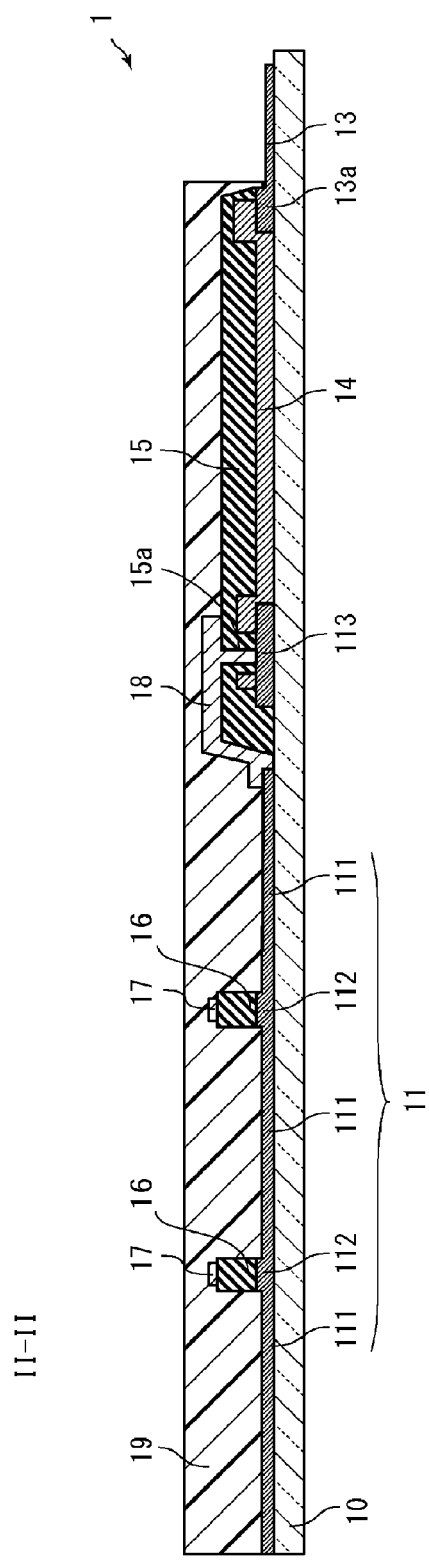
FIG. 2 is a cross-sectional view along the line II-II of FIG. 1.
Figure 3:
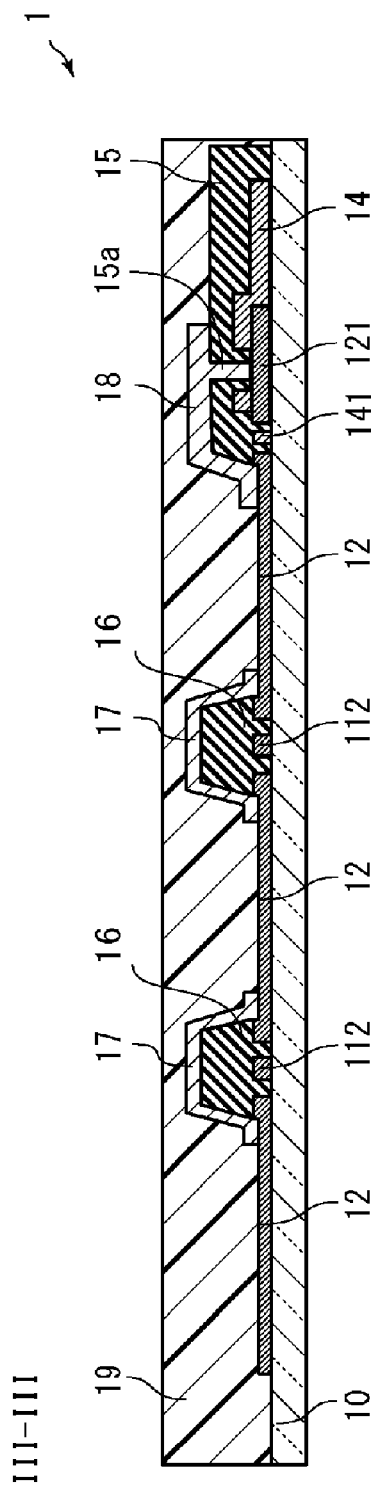
FIG. 3 is a cross-sectional view along the line III-III of FIG. 1.

FIG. 1 is a plan view that schematically shows a configuration of a touch panel 1. FIG. 2 is a cross-sectional view of FIG. 1 along the line II-II. FIG. 3 is a cross-sectional view of FIG. 1 along the line III-III. The touch panel 1 includes an insulating substrate 10, first electrodes 11 that extend in the left and right direction of FIG. 1, second electrodes 12, lead-out electrodes 113 and 121, terminals 13, wiring lines 14, a ground wiring line 141, insulating films 15 and 16, bridges 17 and 18, a protective film 19, and the like. FIG. 1 depicts the wiring lines 14 and the ground wiring line 141 with a hatching pattern for ease of viewing.

As shown in FIGS. 2 and 3, the touch panel 1 has a layered structure in which an electrode layer (first electrodes 11, second electrodes 12, terminals 13, wiring lines 14, and the like), an insulating film layer (insulating films 15 and 16), a bridge layer (bridges 17 and 18), and the protective film 19 are layered in this order on the substrate 10.

Figure 4:
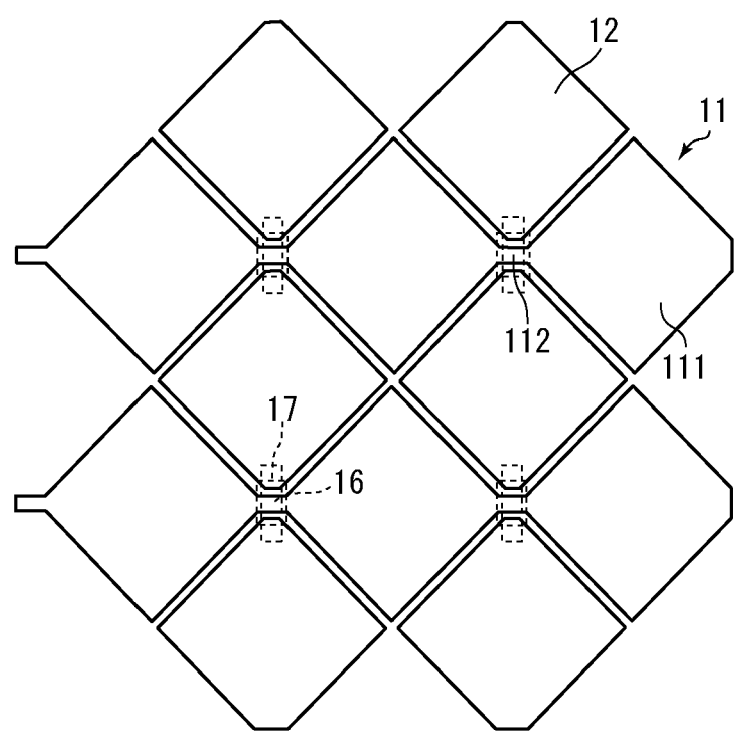
FIG. 4 is a schematic view of only first electrodes and second electrodes in the touch panel configuration of Embodiment 1 of the present invention.

FIG. 4 is a schematic view showing only the first electrodes 11 and second electrodes 12 among the configuration of the touch panel 1. As shown in FIG. 4, the first electrodes 11 include the electrode sections 111 and the connecting portions 112.

The first electrodes 11 include a plurality of electrode sections 111 and connecting portions 112 formed integrally and extending in one direction (left and right direction of FIG. 4). The plurality of first electrodes 11 are aligned in a direction perpendicular (up and down direction of FIG. 4) to the extension direction.

In the direction perpendicular (up and down direction of FIG. 4) to the extension direction of the first electrodes 11, the plurality of second electrodes 12 are connected to each other through bridges 17. Insulating films 16 are formed between the bridges 17 and connecting portions 112 where they intersect. As a result, the bridges 17 and connecting portions 112 are not electrically connected.

Figure 5:
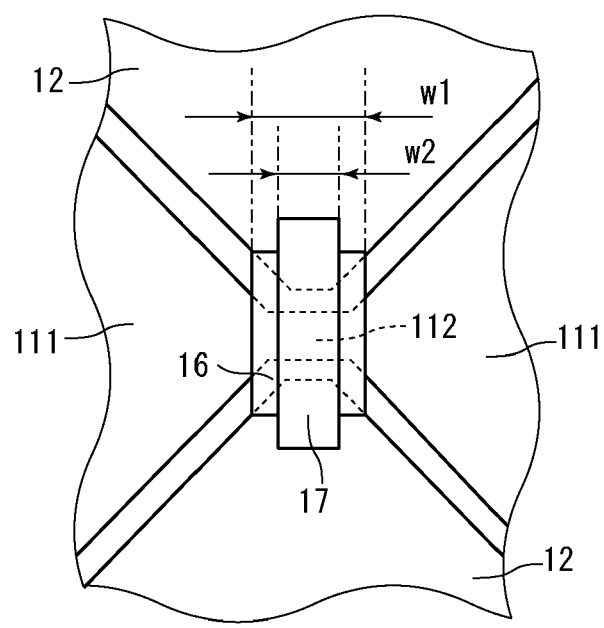
FIG. 5 is a magnified view of an intersection between a first electrode and a second electrode.

FIG. 5 is a magnified view of the intersection between a first electrode 11 and a second electrode 12. The insulating film 16 covers the connecting portion 112. Also, as shown in FIG. 5, the insulating film 16 covers a portion of the second electrode 12.

A width w1 of the insulating film 16 is formed to be greater than a width w2 of the bridge 17 so as to prevent electrical connection between the bridge 17 and the first electrode 11.

In this manner, the plurality of first electrodes 11 and second electrodes 12 are aligned so as to intersect perpendicularly. In the touch panel 1, capacitance is formed between a finger that is proximal to the operating surface, and the first electrodes 11 and second electrodes 12. The touch panel 1 determines the position of the finger on the operating surface based on changes in this capacitance. In other words, the touch panel 1 is a capacitive type touch panel.

More descriptions will be made based on FIG. 1. Lead-out electrodes 113 and 121 are formed around the area where the first electrodes 11 and second electrodes 12 are formed. The lead-out electrodes 113 and 121 are electrically connected to terminals 13 formed in the periphery of the insulating substrate 10 through wiring lines 14. Also, a ground wiring line 141 is formed around the area where the first electrodes 11 and second electrodes 12 are formed.

An insulating film 15 is formed so as to cover all of the lead-out electrodes 113 and 121, all of the wiring lines 14, and the ground wiring line 141, and a portion of the terminals 13. The insulating film 15 protects the wiring lines 14 from processes such as etching during the manufacturing process of the touch panel 1, thereby improving the reliability of the wiring lines 14.

The insulating film 15 has formed therein contact holes 15a. The first electrodes 11 and lead-out electrodes 113 are electrically connected by bridges 18 through the contact holes 15a. Similarly, the second electrodes 12 and lead-out electrodes 121 are electrically connected by bridges 18 through the contact holes 15a.

The protective film 19 is formed so as to cover the first electrodes 11, the second electrodes 12, the terminals 13, the insulating films 15 and 16, the bridges 17 and 18, and the like. A portion of the terminals 13 is not covered by the protective film 19. The terminals 13 are connected to external driver circuits through a flexible printed substrate or the like.

Figure 6A:
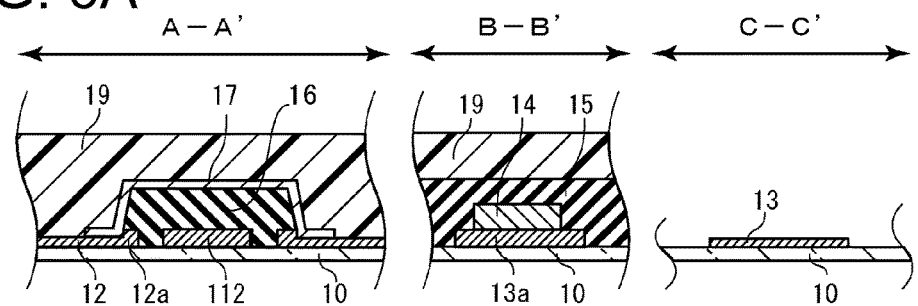
FIG. 6A shows cross-sectional views of FIG. 1 along the lines A-A', B-B', and C-C'.
Figure 6B:
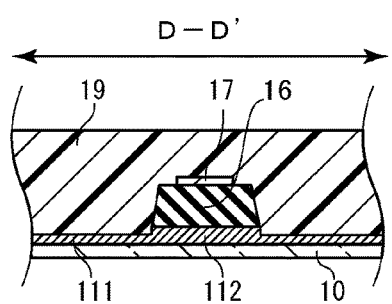
FIG. 6B is a cross-sectional view of FIG. 1 along the line D-D'.

Next, with reference to FIGS. 6A and 6B, details of the touch panel 1 will be described. FIG. 6A shows cross-sectional views of FIG. 1 along the lines A-A', B-B', and C-C'. FIG. 6B is a cross-sectional view of FIG. 1 along the line D-D'.

As described above, the insulating films 16 are formed in portions where the connecting portions 112 of the first electrodes 11 and the bridges 17 intersect. It is preferable that the insulating film 16 have a tapered shape that protrudes in a direction opposite to the substrate 10 as shown in the cross-sectional view along the line A-A' in FIG. 6A. If the side faces of the insulating film 16 are perpendicular to the substrate 10, then this forms a step, which sometimes results in unstable connection at the bridge 17.

The insulating films 16 cover the connecting portions 112 of the first electrodes 11, and a portion of the second electrodes 12. It is preferable that the insulating film 16 be formed so as to also cover a portion of the second electrodes 12 as in the present embodiment. If the insulating films 16 are formed so as to cover only the connecting portions 112, then gaps are formed between the insulating films 16 and the second electrodes 12. If the bridges 17 are formed in these gaps, steps are formed due to the thickness of the second electrodes 12, which sometimes results in unstable connection at the bridges 17.

As shown in the cross-sectional view along the line A-A' in FIG. 6A, the thickness of a portion 12a of the second electrode 12 covered by the insulating film 16 is greater than that of portions not covered by the insulating film 16. As shown in FIG. 6B, the thickness of the connecting portion 112 covered by the insulating film 16 is also greater than in portions of the electrode sections 111 not covered by the insulating film 16.

As shown in the cross-sectional views along the lines B-B' and C-C' in FIG. 6A, the thickness of a portion 13a of the terminal 13 covered by the insulating film 15 is greater than that of portions not covered by the insulating film 15.

<Manufacturing Method for Touch Panel 1>

A manufacturing method for the touch panel 1 will be described with reference to FIGS. 7A to 7E. FIGS. 7A to 7E show cross-sectional views of FIG. 1 along the lines A-A', B-B', and C-C'.

First the insulating substrate 10 is prepared. The insulating substrate 10 is a glass substrate, for example.

<Step of Forming Electrodes and Step of Forming Terminals (FIG. 7A)>

A uniform transparent electrode film is formed by sputtering or CVD (chemical vapor deposition) onto the entire surface of the insulating substrate 10. The transparent electrode film is ITO or IZO, for example. There is no special limitation on the thickness of the transparent electrode film, but it is 10 nm to 30 nm, for example.

The transparent electrode film formed over the entire surface of the substrate 10 is patterned by photolithography. The first electrodes 11, the second electrodes 12, the lead-out electrodes 113 and 121 (not shown), and the terminals 13 are formed by patterning. More specifically, masks made of photoresist are formed over portions where the first electrodes 11, second electrodes 12, and the like are to be formed. The remaining portions are removed by etching.

The etching type can be selected from a group including a highly alkaline solution treatment, hydrofluoric acid treatment, chlorine gas dry etching, and a combination thereof, for example. Below, "etching" is defined to include all types of etching mentioned above.

Here, a case in which the first electrodes 11, the second electrodes 12, the lead-out electrodes 113 and 121, and the terminals 13 are formed simultaneously and of the same material is described. However, some or all of these may be made of different materials or formed by a plurality of patterning steps. The manufacturing process can be simplified to the greatest extent if these components are all formed simultaneously and of the same material.

<Step of Forming Wiring Lines (FIG. 7B)>

Next, a metal film is formed over the entire surface of the substrate 10 by sputtering or vapor deposition. The metal film is a low-resistance metal film such as Al, for example. It is preferable that a structure be used in which a plurality of types of metal films are layered in order to improve the adhesion of the lower layer and upper layer, and to improve resistance to corrosion. A metal film in which MoNb, Al, and MoNB are layered in this order can be used, for example. There is no special limitation on the thickness of the metal film, but it is 0.3 µm to 1.0 µm, for example.

Figure 7A:
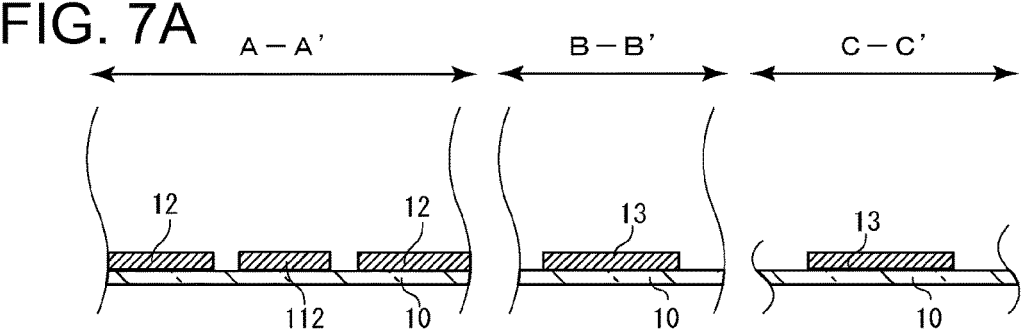
FIG. 7A shows cross-sectional views schematically showing a step of forming electrodes and a step of forming terminals in a manufacturing method for the touch panel of Embodiment 1 of the present invention.
Figure 7B:
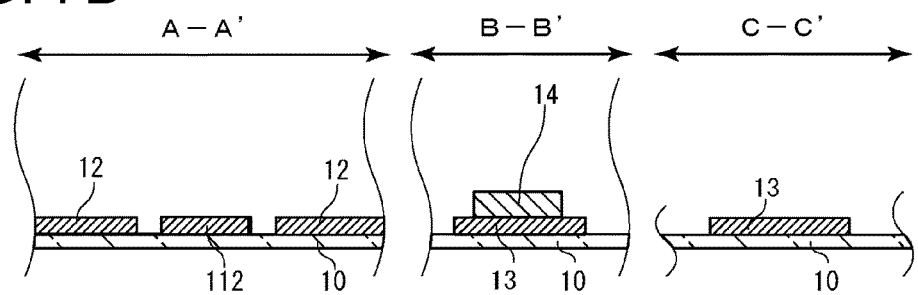
FIG. 7B shows cross-sectional views schematically showing a step of forming wiring lines in the manufacturing method for the touch panel of Embodiment 1 of the present invention.

The metal film formed over the entire surface of the substrate 10 is patterned by photolithography. As shown in FIG. 7B, the wiring lines 14 and the ground wiring line 141 (not shown) are formed by patterning. More specifically, masks made of photoresist are formed over portions where the wiring lines 14 and the ground wiring line 141 are to be formed. The remaining portions are removed by etching.

<Step of Forming Insulating Films and Step of Treating Surfaces (FIG. 7C)>

Next, the insulating films 15 and 16 are formed. Oxygen-rich layers on the surfaces of the first electrodes 11, the second electrodes 12, and the terminals 13 (referred to below as "the first electrodes 11 and the like") are removed either directly following the formation of the insulating films 15 and 16 or simultaneously with the formation thereof.

The insulating films 15 and 16 can be formed of an organic material (a photoresist including an acrylic resin, a novolac resin, or the like, for example) or an inorganic material (SiN, $SiO_2$, SiON, or the like). The steps differ depending on whether an organic material is used or an inorganic material is used, and thus, each case will be described separately.

<Case in which Insulating Films 15 and 16 are an Organic Material>

Photoresist is evenly coated onto the entire surface of the substrate 10 by a spin coater or a slit coater. It is better that the thickness of the coated photoresist be as great as possible, and preferably at least 6 µm.

The photoresist may be of a positive type in which the solubility thereof in developer decreases upon exposure to light, or a negative type in which the solubility thereof in developer increases upon exposure to light. After the coating of the photoresist, prebaking, exposure, developing, postbaking, and the like are preformed, thus forming the insulating films 15 and 16 in prescribed locations.

As previously mentioned, it is preferable that the insulating films 16 have tapered shapes that protrude towards the direction opposite to the substrate 10. Such a tapered shape can be formed by using photomasks of differing light transmittance and performing exposure in steps.

After the formation of the insulating films 15 and 16, etching is performed to remove the oxygen-rich layers on the surfaces of the first electrodes 11 and the like.

The removal of the oxygen-rich layers from the surfaces of the first electrodes 11 and the like can be performed simultaneously with the formation of the insulating films 15 and 16. When patterning the insulating films 15 and 16, a highly alkaline liquid is used as the developer. The developing step when patterning the insulating films 15 and 16 should be done for a longer period of time than usual such that the surfaces of the first electrodes 11 and the like are etched by the developer.

Figure 7C:
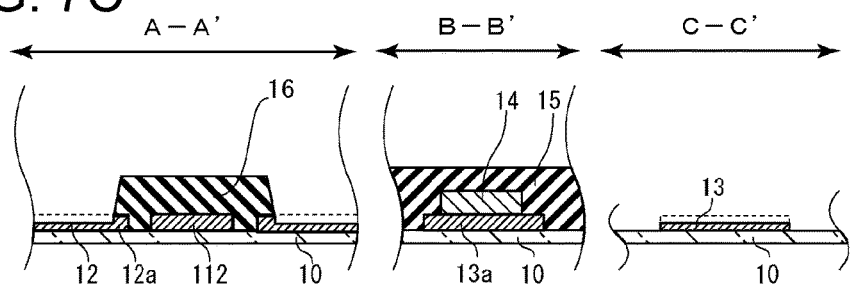
FIG. 7C shows cross-sectional views schematically showing a step of forming insulating films and a step of treating a surface in the manufacturing method for the touch panel of Embodiment 1 of the present invention.
Figure 7D:
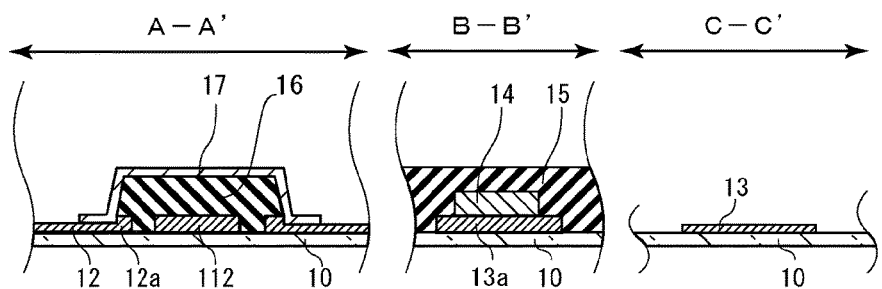
FIG. 7D shows cross-sectional views schematically showing a step of forming bridges in the manufacturing method for the touch panel of Embodiment 1 of the present invention.
Figure 7E:
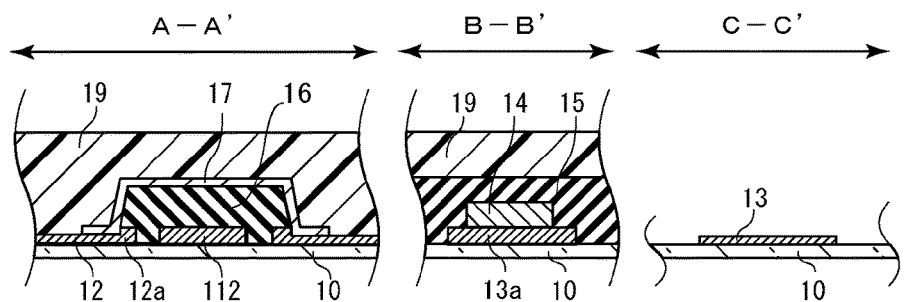
FIG. 7E shows cross-sectional views schematically showing a step of forming a protective film in the manufacturing method for the touch panel of Embodiment 1 of the present invention.

At this time, the insulating film 16 functions as a mask, and thus, portions of the first electrodes 11 and second electrodes 12 covered by the insulating film 16 are not etched. Therefore, the portions in FIG. 7C depicted with broken lines indicate portions that have been etched. Thus, the thickness of the portion 12a of the second electrode 12 covered by the insulating film 16 is greater than that of portions not covered by the insulating film 16. Although not shown in FIG. 7C, portions of the first electrode 11 covered by the insulating film 16 also have a greater thickness than portions not covered by the insulating film 16.

Similarly, the insulating film 15 functions as a mask, and thus, portions of the terminals 13 covered by the insulating film 15 are not etched. Thus, the thickness of the portion 13a of the terminal 13 covered by the insulating film 15 is greater than that of portions not covered by the insulating film 15.

<Case in which Insulating Films 15 and 16 are an Inorganic Material>

An even inorganic film of SiN, $SiO_2$, SiON or the like is formed on the entire surface of the substrate 10 by CVD. It is better that the thickness of the inorganic film be as great as possible, and preferably twice or more the thickness of the wiring lines 14.

The inorganic film formed over the entire surface of the substrate 10 is patterned by photolithography. The insulating films 15 and 16 are formed by patterning. More specifically, masks made of photoresist are formed in portions where the insulating films 15 and 16 are to be formed. The remaining portions are removed by etching.

After forming the insulating films 15 and 16, the oxygen-rich layers on the surfaces of the first electrodes 11 and the like are removed. Specifically, the surfaces of the first electrodes 11 and the like are etched while leaving in place the masks formed when patterning the insulating films 15 and 16, in order to protect the insulating films 15 and 16. The etching may be of the same type used when forming the insulating films 15 and 16 or of a different type.

The removal of the oxygen-rich layers from the surfaces of the first electrodes 11 and the like can be performed simultaneously with the formation of the insulating films 15 and 16. Specifically, the etching time when patterning the insulating films 15 and 16 should be made longer than normal such that the surfaces of the first electrodes 11 and the like are etched simultaneously with the formation of the insulating films 15 and 16.

At this time, etching is performed while leaving in place the mask for forming the insulating films 16, and thus, portions of the first electrodes 11 and second electrodes 12 covered by the insulating films 16 are not etched. Thus, the portions of FIG. 7C depicted with broken lines are etched. Thus, portions 12a of the second electrodes 12 covered by the insulating films 16 are greater in thickness than the portions not covered by the insulating films 16. Although not shown in FIG. 7C, the portions of the first electrodes 11 covered by the insulating film 16 are also greater in thickness than portions not covered by the insulating film 16 (refer to FIG. 6B).

Similarly, etching is performed while leaving in place the mask for forming the insulating film 15, and thus, portions of the terminals 13 covered by the insulating film 15 are not etched. Thus, portions 13*a* of the terminals 13 covered by the insulating film 15 are greater in thickness than portions not covered by the insulating film 15.

The step of forming the insulating films 15 and 16 and the step of removing the oxygen-rich layers were described above, both for a case in which an organic material was used for the insulating film 15 and 16 and a case in which an inorganic material was used therefor. The removal of the oxygen-rich layer may be performed simply by removing the topmost portions of the surfaces of the first electrodes 11 and the like. Effects can be attained if at least 0.4 nm is removed.

<Step of Forming Bridges (FIG. 7D)>

Next, the bridges 17 and 18 (not shown) are formed. A transparent electrode film such as ITO or IZO is evenly formed over the entire surface of the substrate 10 by CVD, sputtering, or the like. Then, the bridges 17 and 18 are formed by performing patterning by photolithography.

<Step of Forming Protective Film (FIG. 7E)>

Lastly, the protective film 19 is evenly coated by spin coating or slit coating. At this time, a metal mask or the like is used such that the protective film 19 does not cover portions of the terminals 13. The protective film 19 is an acrylic resin, for example. There is no special limitation on the thickness of the protective film 19, but it is 2 µm to 3 µm, for example.

The manufacturing method for the touch panel 1 has been described above.

According to the manufacturing method for the touch panel 1 of the present embodiment, the oxygen-rich layers on the surfaces of the first electrodes 11 and the like are removed prior to the formation of the bridges 17 and 18. Thus, neither the semicrystalline ITO film nor the semicrystalline IZO film, which are difficult to remove by etching, are formed. Thus, the formation of the electrode film residue can be mitigated. Thus, it is possible to prevent the electrode patterns from being seen with ease due to electrode film residue.

Also, according to the touch panel 1 of the present embodiment, the portions of the first electrodes 11 covered by the insulating films 16 are greater in thickness than the portions not covered by the insulating films 16. The connecting portions 112 covered by the insulating films 16 are greater in thickness than the electrode sections 111 not covered by the insulating films 16, for example.

The transparent electrodes such as the first electrodes 11 have a greater transparency the thinner they are, thus making them difficult to see. On the other hand, the thinner they are, the less the cross-sectional area is, which increases resistance and decreases the sensitivity of the electrodes as sensors. In particular, the connecting portions 112 are narrow, and thus, there are localized increases in resistance. According to the present embodiment, by selectively increasing the thickness of the connecting portions 112, the resistance of the first electrodes 11 can be decreased. On the other hand, by having the other portions be thin, the electrode patterns can be made difficult to see.

<Comparison Example>

Figure 8:
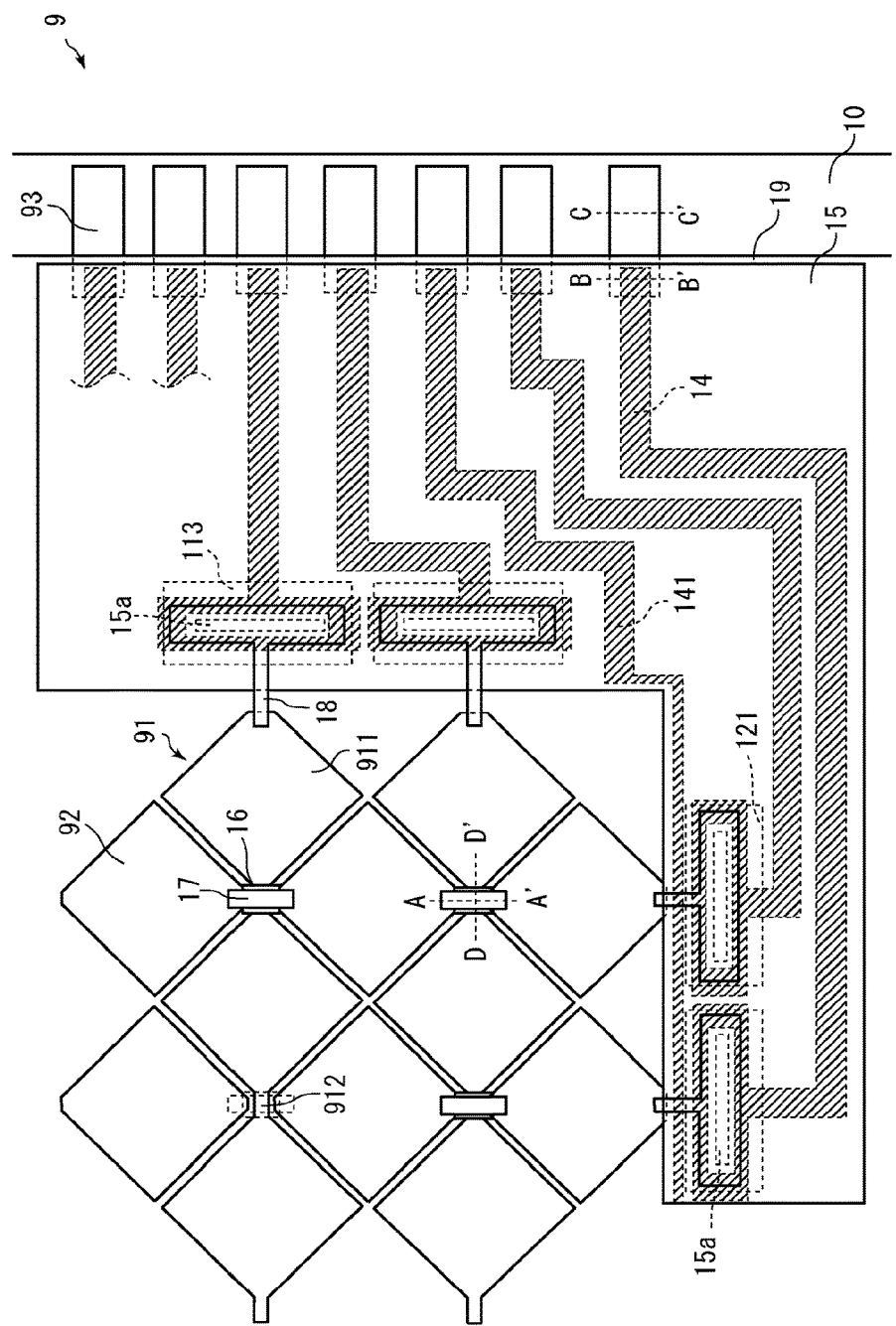
FIG. 8 is a plan view that schematically shows a touch panel configuration according to a comparison example.

A comparison example will be described in order to describe the effects of the present embodiment. FIG. 8 is a plan view that schematically shows a configuration of a touch panel 9 according to a comparison example. FIG. 8 depicts the wiring lines 14 and the ground wiring line 141 with a hatching pattern for ease of viewing.

The touch panel 9 includes an insulating substrate 10, first electrodes 91, second electrodes 92, lead-out electrodes 113 and 121, terminals 93, wiring lines 14, a ground wiring line 141, insulating films 15 and 16, bridges 17 and 18, a protective film 19, and the like. The first electrodes 91 include electrode sections 911 and connecting portions 912. In other words, the touch panel 9 has a different configuration of first electrodes, second electrodes, and terminals compared to the touch panel 1.

Figure 9A:
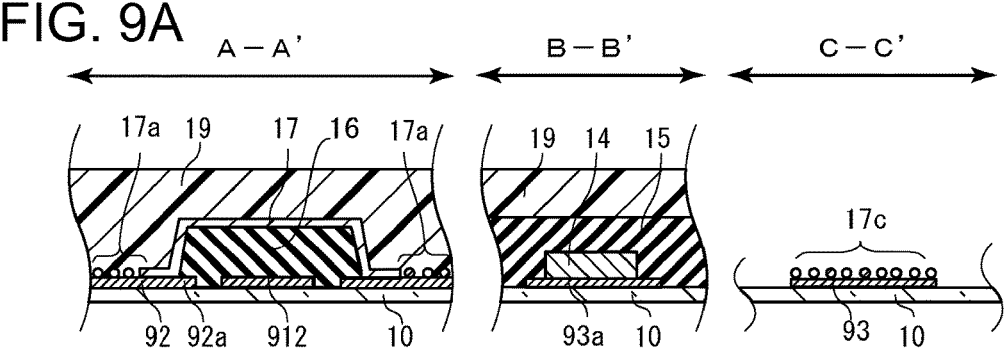
FIG. 9A shows cross-sectional views of FIG. 8 along the lines A-A', B-B', and C-C'.
Figure 9B:
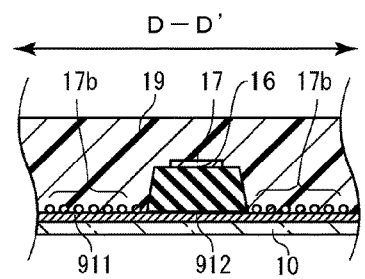
FIG. 9B is a cross-sectional view of FIG. 8 along the line D-D'.

FIG. 9A shows cross-sectional views of FIG. 8 along the lines A-A', B-B', and C-C'. FIG. 9B is a cross-sectional view of FIG. 8 along the line D-D'.

As shown in the cross-sectional view in FIG. 9A along A-A', portions of the second electrodes 92 not covered by the insulating film 16 or bridges 17 have electrode film residue 17*a*. As shown in the cross-sectional view in FIG. 9A along C-C', portions of the terminals 13 not covered by the insulating film 15 have electrode film residue 17*c*. As shown in FIG. 9B, portions of the electrode sections 911 not covered by the insulating films 16 have electrode film residue 17*b*.

<Manufacturing Method for Touch Panel 9>

A manufacturing method for the touch panel 9 will be schematically described with reference to FIGS. 10A to 10E.

Figure 10A:
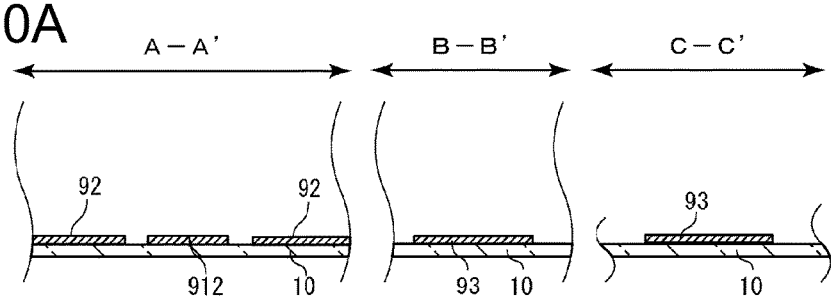
FIG. 10A shows cross-sectional views schematically showing a step of forming electrodes and a step of forming terminals in a manufacturing method for a touch panel of a comparison example.
Figure 10B:
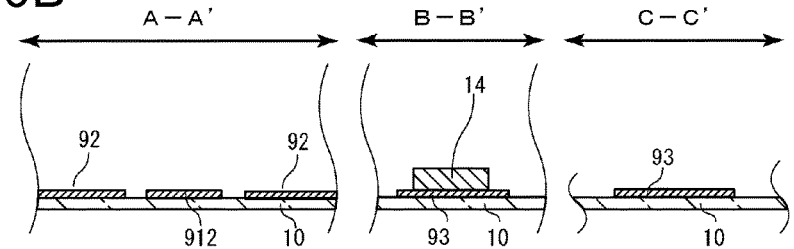
FIG. 10B shows cross-sectional views schematically showing a step of forming wiring lines in the manufacturing method for the touch panel of the comparison example.
Figure 10C:
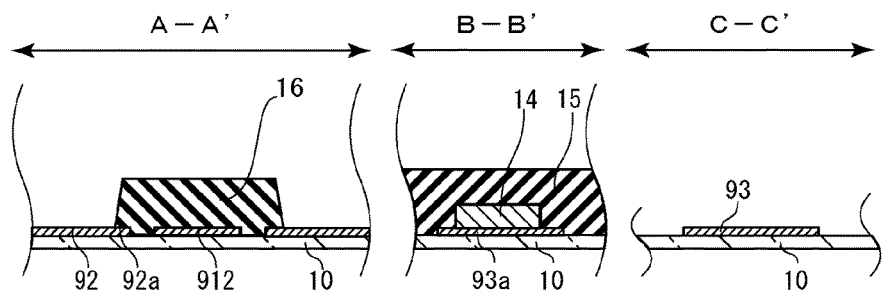
FIG. 10C shows cross-sectional views schematically showing a step of forming insulating films in the manufacturing method for the touch panel of the comparison example.
Figure 10D:
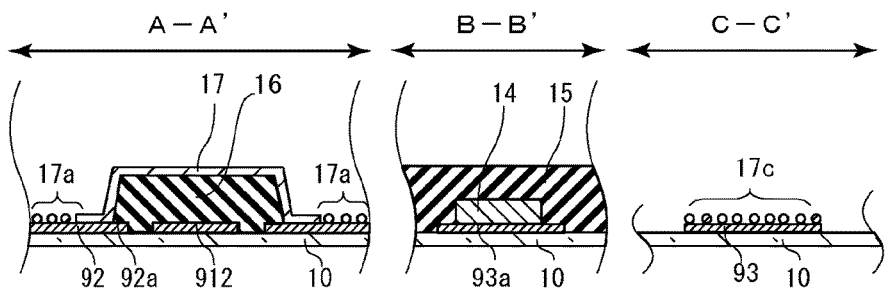
FIG. 10D shows cross-sectional views that schematically show a step of forming bridges in the manufacturing method for the touch panel of the comparison example.
Figure 10E:
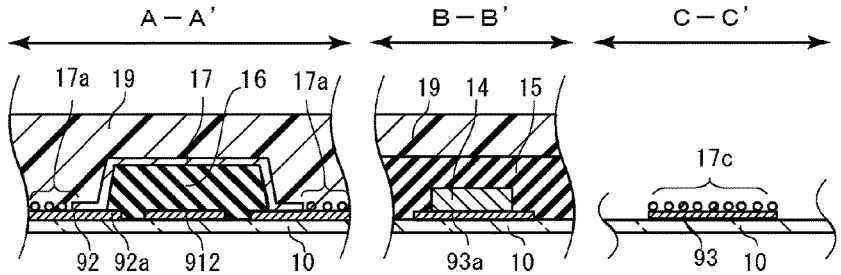
FIG. 10E shows cross-sectional views schematically showing a step of forming a protective film in the manufacturing method for the touch panel of the comparison example.

The manufacturing method for the touch panel 9 is similar to the manufacturing method for the touch panel 1 in including steps of forming electrodes and terminals (FIG. 10A), a step of forming wiring lines (FIG. 10B), a step of forming insulating films (FIG. 10C), a step of forming bridges (FIG. 10D), and a step of forming a protective film (FIG. 10E). However, the manufacturing method for the touch panel 9 does not include a step of removing the oxygen-rich layers of the surfaces of the electrodes and the like.

Thus, when forming the bridges 17 and 18, the ITO film or the IZO film is formed on the oxygen-rich layers. The ITO film or the IZO film formed on the oxygen rich layers becomes a semicrystalline ITO film or a semicrystalline IZO film. The semicrystalline ITO film and semicrystalline IZO film are more difficult to etch than the amorphous ITO film and amorphous IZO film. Thus, when forming the bridges 17 and 18, the electrode film residues 17*a* to 17*c* result.

Compared to the manufacturing method of the touch panel 9 of the comparison example above, the manufacturing method of the touch panel 1 of the present embodiment allows the oxygen-rich layers of the surfaces of the first electrodes 11 and the like to be removed prior to the formation of the bridges 17 and 18. Thus, such electrode film residues 17*a* to 17*c* do not result.

<Embodiment 2>

Figure 11:
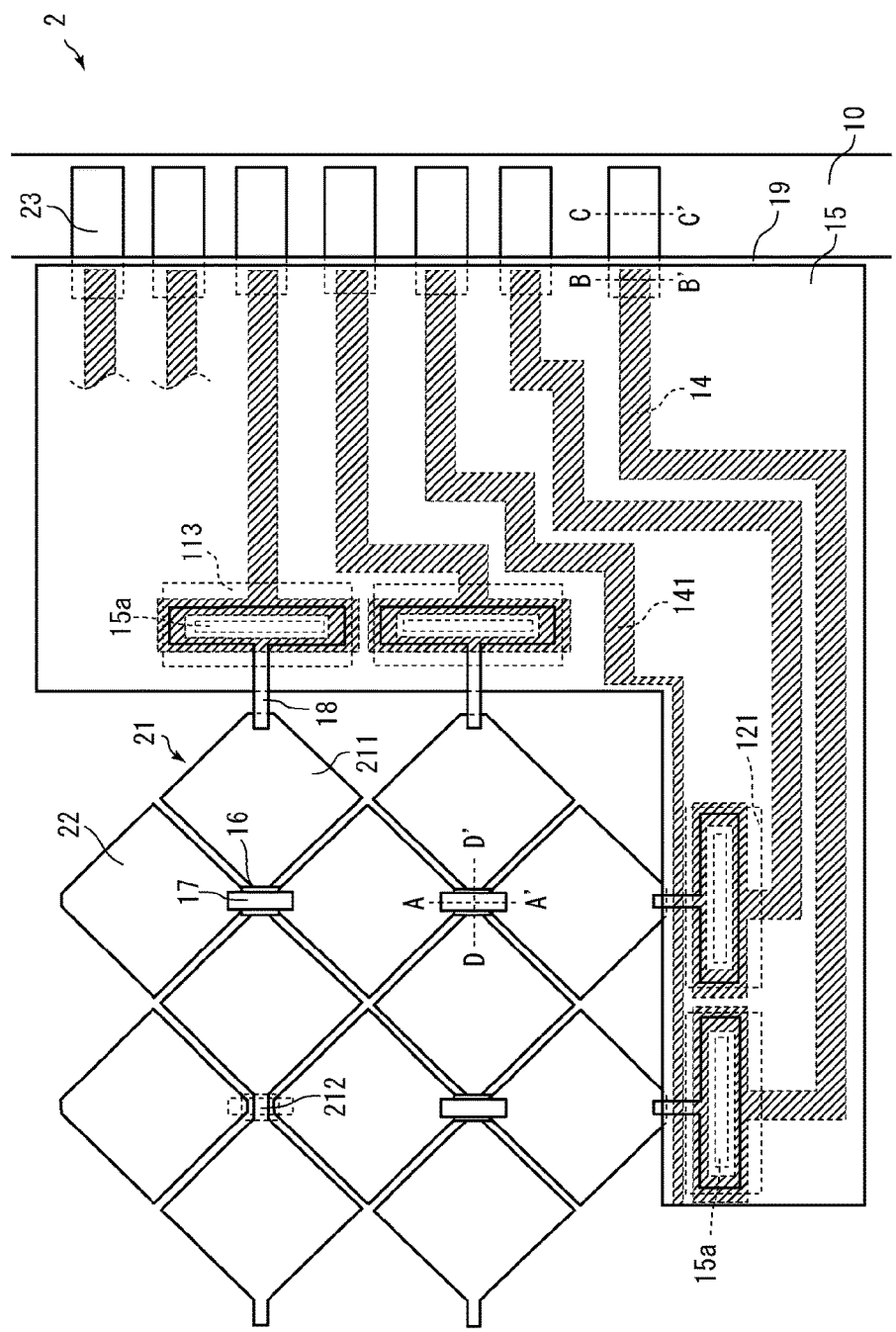
FIG. 11 is a plan view that schematically shows a touch panel configuration according to Embodiment 2 of the present invention.

FIG. 11 is a plan view that schematically shows a configuration of a touch panel 2 according to Embodiment 2 of the present invention. In FIG. 11, the wiring lines 14 and the ground wiring line 141 are depicted with a hatching pattern for ease of viewing.

The touch panel 2 includes an insulating substrate 10, first electrodes 21, second electrodes 22, lead-out electrodes 113 and 121, terminals 23, wiring lines 14, a ground wiring line 141, insulating films 15 and 16, bridges 17 and 18, a protective film 19, and the like. The first electrodes 21 include electrode sections 211 and connecting portions 212. In other words, the touch panel 2 has a different configuration of the first electrodes, second electrodes, and terminals compared to the touch panel 1.

Figure 12A:
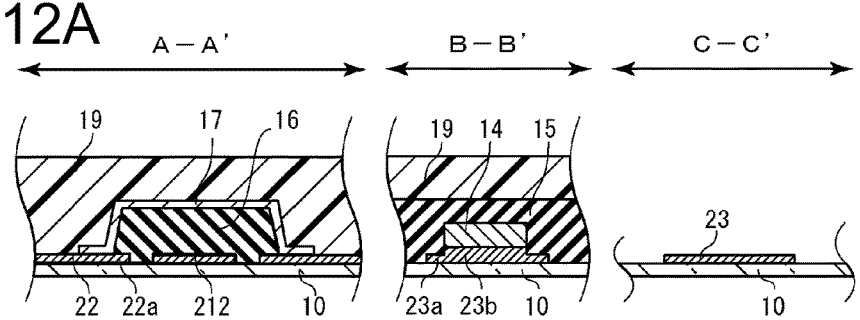
FIG. 12A shows cross-sectional views of FIG. 11 along the lines A-A', B-B', and C-C'.
Figure 12B:
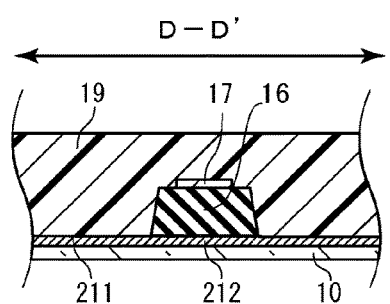
FIG. 12B is a cross-sectional view of FIG. 11 along the line D-D'.

FIG. 12A shows cross-sectional views of FIG. 11 along the lines A-A', B-B', and C-C'. FIG. 12B is a cross-sectional view of FIG. 11 along the line D-D'.

As shown in the cross-sectional view in FIG. 12A along the line A-A', portions 22a of the second electrodes 22 covered by the insulating films 16 have the same thickness as the portions not covered by the insulating film 16, unlike the touch panel 1. As shown in FIG. 12B, the thickness of the connecting portions 212 and the thickness of the electrode sections 211 are also the same.

As shown in the cross-sectional views in FIG. 12A along the lines B-B' and C-C', portions 23a of the terminals 23 covered by the insulating film 15 are the same in thickness as the portions that are covered neither by the insulating film 15 nor the wiring lines 14, unlike the touch panel 1. On the other hand, the portions 23b of the terminals 23 covered by the wiring lines 14 are greater in thickness than portions not covered by the wiring lines 14.

<Manufacturing Method for Touch Panel 2>

The manufacturing method for the touch panel 2 will be schematically described with reference to FIGS. 13A to 13E.

Figure 13A:
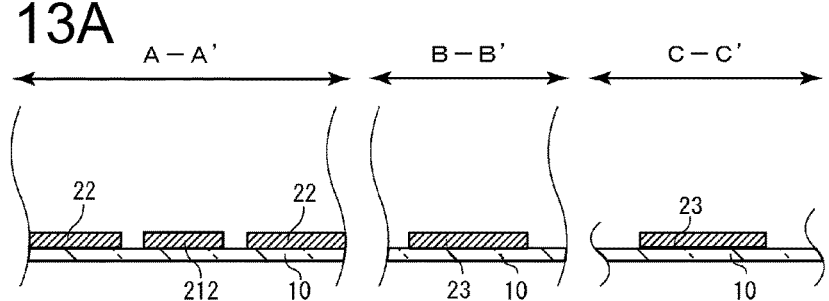
FIG. 13A shows cross-sectional views schematically showing a step of forming electrodes and a step of forming terminals in a manufacturing method for the touch panel of Embodiment 2 of the present invention.
Figure 13B:
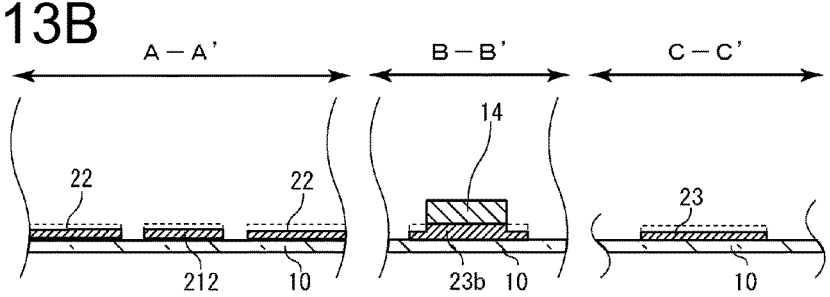
FIG. 13B shows cross-sectional views schematically showing a step of forming wiring lines and a step of treating a surface in the manufacturing method for the touch panel of Embodiment 2 of the present invention.
Figure 13C:
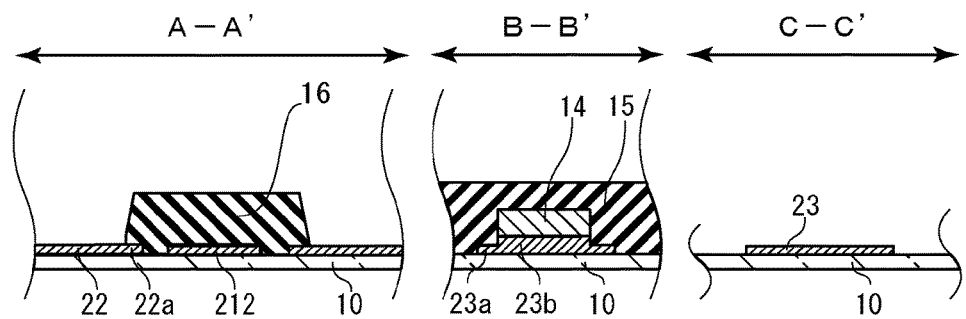
FIG. 13C shows cross-sectional views schematically showing a step of forming insulating films in the manufacturing method for the touch panel of Embodiment 2 of the present invention.
Figure 13D:
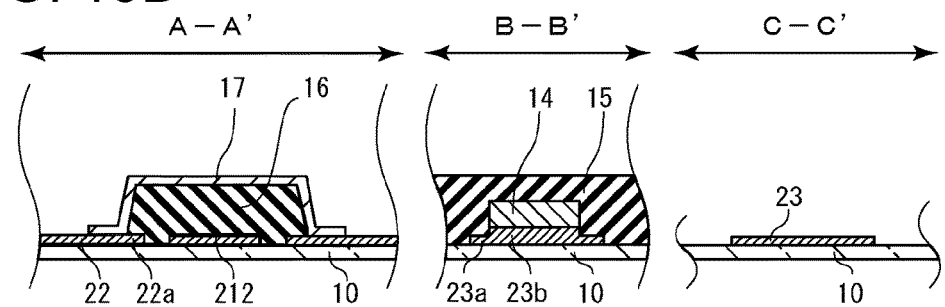
FIG. 13D shows cross-sectional views schematically showing a step of forming bridges in the manufacturing method for the touch panel of Embodiment 2 of the present invention.
Figure 13E:
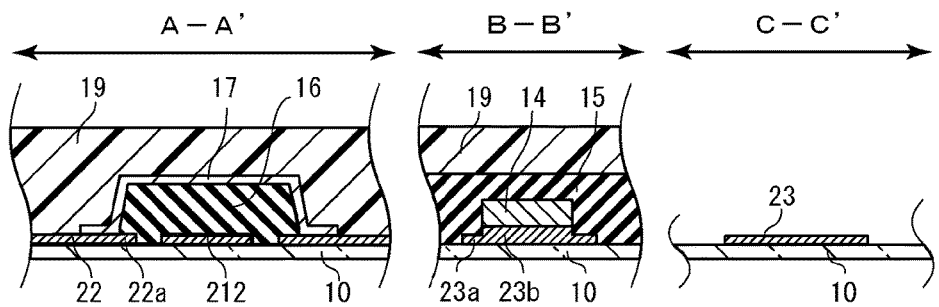
FIG. 13E shows cross-sectional views schematically showing a step of forming a protective film in the manufacturing method for the touch panel of Embodiment 2 of the present invention.

The manufacturing method for the touch panel 2 is similar to the manufacturing method for the touch panel 1 in including steps of forming electrodes and terminals (FIG. 13A), a step of forming wiring lines (FIG. 13B), a step of forming insulating films (FIG. 13C), a step of forming bridges (FIG. 13D), and a step of forming protective films (FIG. 13E). On the other hand, the manufacturing method for the touch panel 2 differs from the manufacturing method for the touch panel 1 in that the step of treating surfaces is performed directly after or simultaneously with the step of forming the wiring lines.

In other words, as shown in FIG. 13B, after patterning the wiring lines 14, etching is performed to remove the oxygen-rich layers on the surfaces of the first electrodes 21, second electrodes 22, and terminals 23, while leaving in place the masks used to pattern the wiring lines 14. Alternatively, the surfaces of the first electrodes 21, second electrodes 22, and terminals 23 may be etched simultaneously with the formation of the wiring lines 14 by lengthening the etching time for patterning the wiring lines 14, or the like.

In the touch panel 2, the surfaces of the first electrodes 21, second electrodes 22, and terminals 23 are etched using the mask used to form the wiring lines 14. Thus, the portions of FIG. 13B depicted with broken lines are etched. Thus, portions 23b of the terminals 23 covered by the wiring lines 14 are greater in thickness than portions not covered by the wiring lines 14.

The manufacturing method for the touch panel 2 according to the present embodiment also results in the oxygen-rich layers of the first electrodes 21, second electrodes 22, and terminals 23 being removed prior to the formation of the bridges 17 and 18. As a result, the formation of electrode film residue is mitigated, thus making the electrode patterns difficult to see.

<Embodiment 3>

Figure 14:
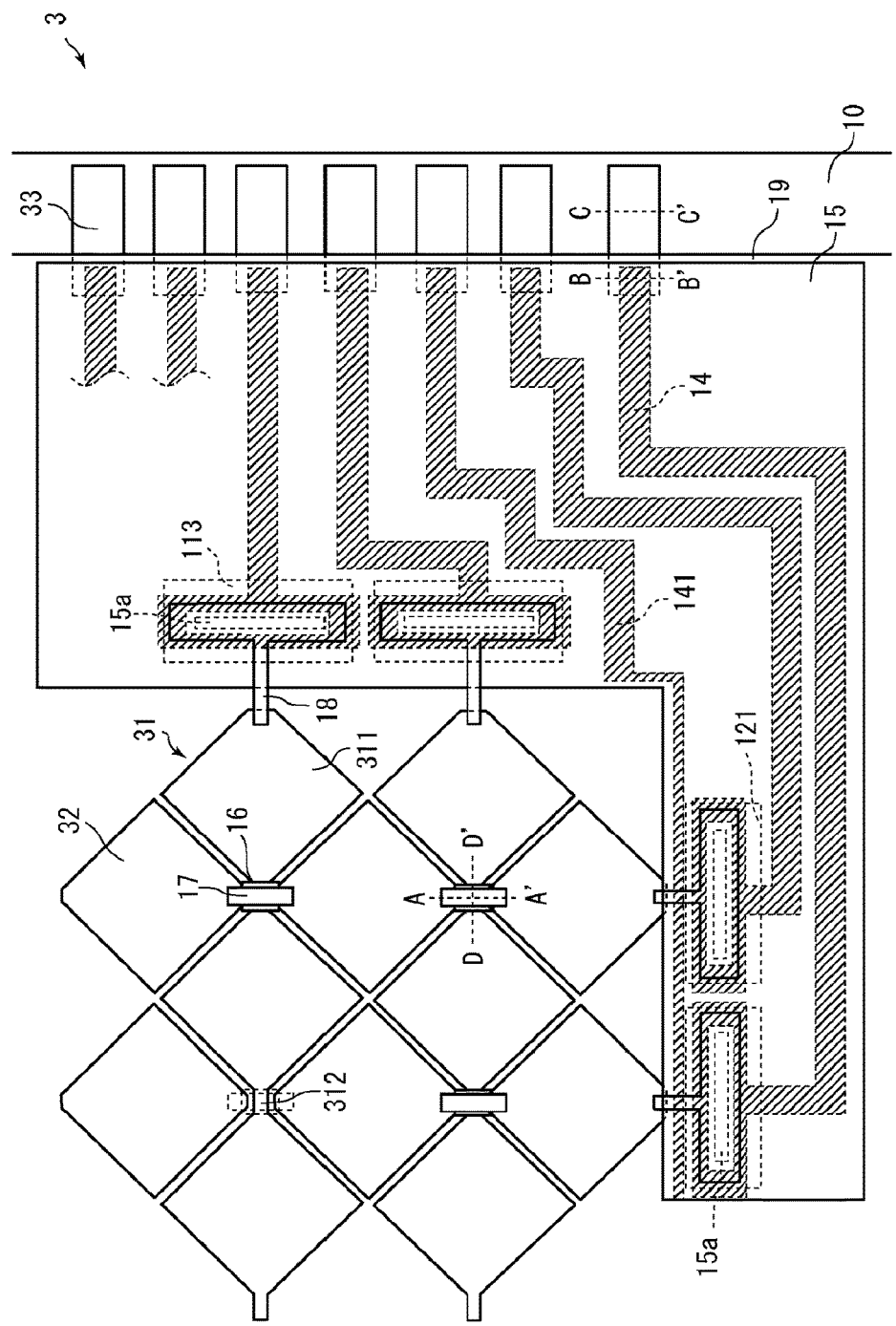
FIG. 14 is a plan view that schematically shows a touch panel configuration according to Embodiment 3 of the present invention.

FIG. 14 is a plan view that schematically shows a configuration of a touch panel 3 according to Embodiment 3 of the present invention. In FIG. 14, the wiring lines 14 and the ground wiring line 141 are depicted with a hatching pattern for ease of viewing.

The touch panel 3 includes an insulating substrate 10, first electrodes 31, second electrodes 32, lead-out electrodes 113 and 121, terminals 33, wiring lines 14, a ground wiring line 141, insulating films 15 and 16, bridges 17 and 18, a protective film 19, and the like. The first electrodes 31 include electrode sections 311 and connecting portions 312. In other words, in the touch panel 3, the configuration of the first electrodes, second electrodes, and terminals differs from that of the touch panel 1.

Figure 15A:
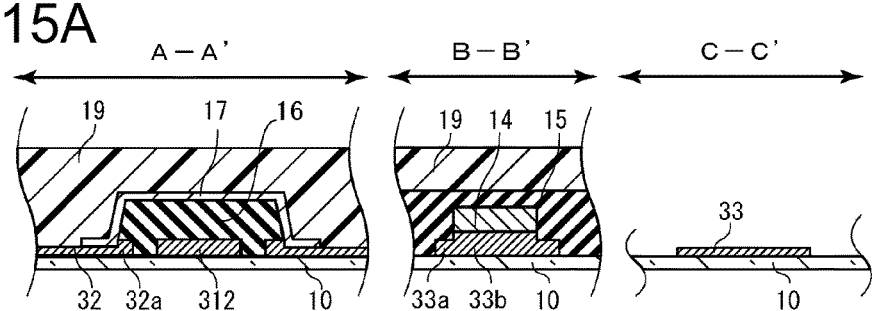
FIG. 15A shows cross-sectional views of FIG. 14 along the lines A-A', B-B', and C-C'.
Figure 15B:
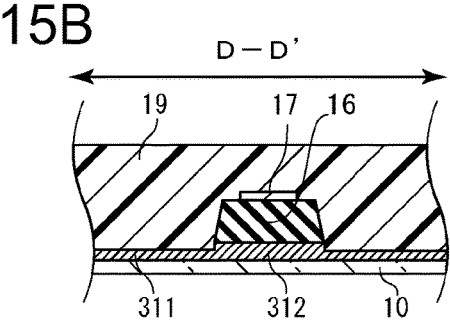
FIG. 15B is a cross-sectional view of FIG. 14 along the line D-D'.

FIG. 15A shows cross-sectional views of FIG. 14 along the lines A-A', B-B', and C-C'. FIG. 15B is a cross-sectional view of FIG. 14 along the line D-D'.

As shown in the cross-sectional view in FIG. 15A along the line A-A', portions 32a of the second electrodes 32 covered by the insulating films 16 are greater in thickness than portions not covered by the insulating films 16. As shown in FIG. 15B, the thickness of the connecting portion 312 covered by the insulating film 16 is also greater than in portions of the electrode sections 311 not covered by the insulating film 16.

As shown in the cross-sectional views in FIG. 15A along the lines B-B' and C-C', portions 33a of the terminals 33 covered by the insulating film 15 are greater in thickness than portions covered by neither the insulating film 15 nor the wiring lines 14. In addition, the portions 33b of the terminals 33 covered by the wiring lines 14 are greater in thickness than portions not covered by the wiring lines 14.

<Manufacturing Method for Touch Panel 3>

A manufacturing method for the touch panel 3 will be schematically described with reference to FIGS. 16A to 16E.

Figure 16A:
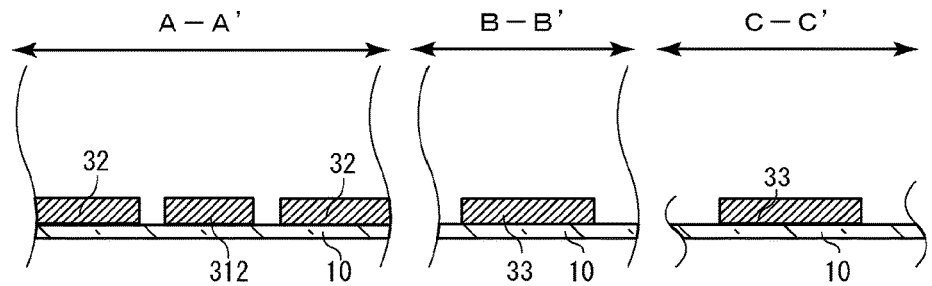
FIG. 16A shows cross-sectional views schematically showing a step of forming electrodes and a step of forming terminals in a manufacturing method for a touch panel of Embodiment 3 of the present invention.
Figure 16B:
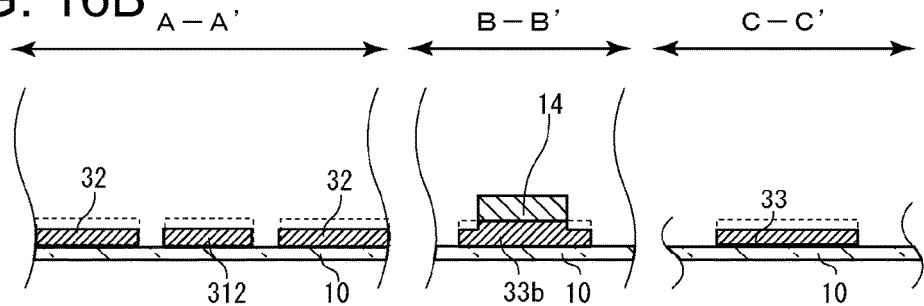
FIG. 16B shows cross-sectional views schematically showing a step of forming wiring lines and a step of treating a surface in the manufacturing method for the touch panel of Embodiment 3 of the present invention.
Figure 16C:
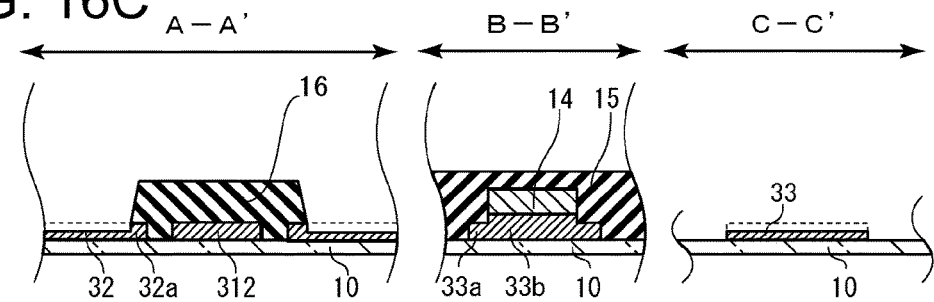
FIG. 16C shows cross-sectional views schematically showing a step of forming insulating films and a step of treating a surface in the manufacturing method for the touch panel of Embodiment 3 of the present invention.
Figure 16D:
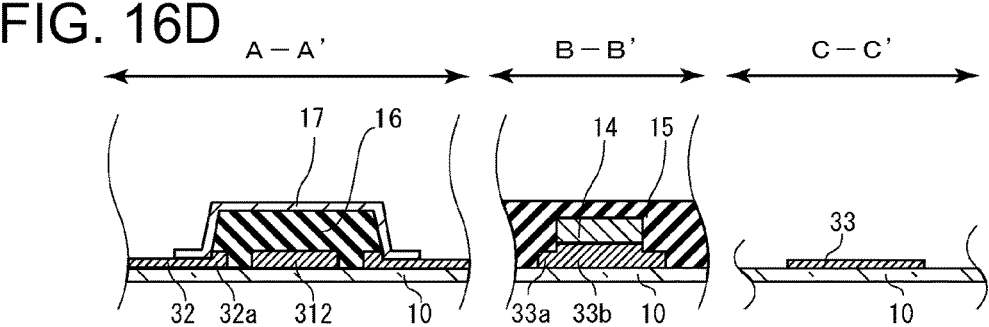
FIG. 16D shows cross-sectional views schematically showing a step of forming bridges in the manufacturing method for the touch panel of Embodiment 3 of the present invention.
Figure 16E:
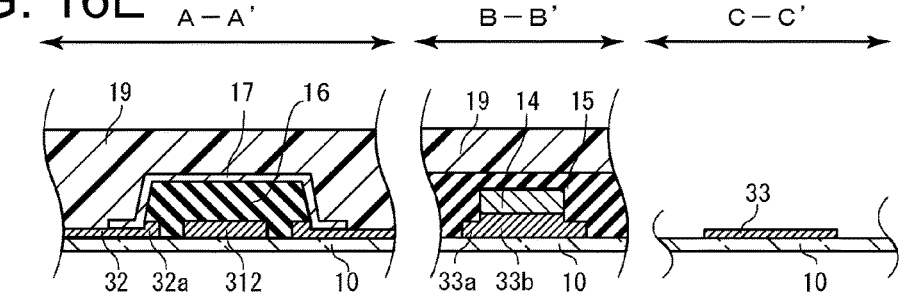
FIG. 16E shows cross-sectional views schematically showing a step of forming a protective film in the manufacturing method for the touch panel of Embodiment 3 of the present invention.

The manufacturing method for the touch panel 3 is similar to the manufacturing method for the touch panel 1 in including steps of forming electrodes and terminals (FIG. 16A), a step of forming wiring lines (FIG. 16B), a step of forming insulating films (FIG. 16C), a step of forming bridges (FIG. 16D), and a step of forming a protective film (FIG. 16E). On the other hand, the method of manufacturing the touch panel 3 differs from the manufacturing method for the touch panel 1 in that the step of treating the surfaces is performed twice. That is, the first step of treating the surfaces is performed directly after or simultaneously with the step of forming the wiring lines. The second step of treating the surfaces is performed directly after or simultaneously with the step of forming the insulating film.

In the first step of treating the surfaces, as shown in FIG. 16B, a mask for forming the wiring lines 14 is used to etch the surfaces of the first electrodes 31, second electrodes 32, and terminals 33. Therefore, the portions in FIG. 16B depicted with broken lines are etched. The portions 33b of the terminals 33 covered by the wiring lines 14 are greater in thickness than the portions not covered by the wiring lines 14.

In the second step of treating the surfaces, as shown in FIG. 16C, the insulating films 15 and 16 are used as masks, or the masks for forming the insulating films 15 and 16 are used in order to etch the surfaces of the first electrodes 31, second electrodes 32, and terminals 33. Thus, the portions of FIG. 16C depicted with broken lines are etched. Thus, the portions 32a of the second electrodes 32 covered by the insulating films 16 are greater in thickness than the portions not covered by the insulating films 16. Also, the connecting portions 312 covered by the insulating films 16 are greater in thickness than portions of the electrode sections 311 not covered by the insulating films 16. The portions 33a of the terminals 33 covered by the insulating film 15 are greater in thickness than portions not covered by the insulating film 15.

The manufacturing method for the touch panel 3 according to the present embodiment also results in the oxygen-rich layers of the first electrodes 31, second electrodes 32, and terminals 33 being removed prior to the formation of the bridges 17 and 18. As a result, the formation of electrode film reside is mitigated, thus preventing the electrode patterns from being seen with ease.

In the present embodiment also, the connecting portions 312 covered by the insulating film 16 are greater in thickness than portions of the electrode sections 311 not covered by the insulating film 16. As a result, the resistance of the first electrodes 31 can be lowered. On the other hand, by reducing the thickness of other portions, the electrode patterns can be made difficult to see.

<Embodiment 4>

Figure 17:
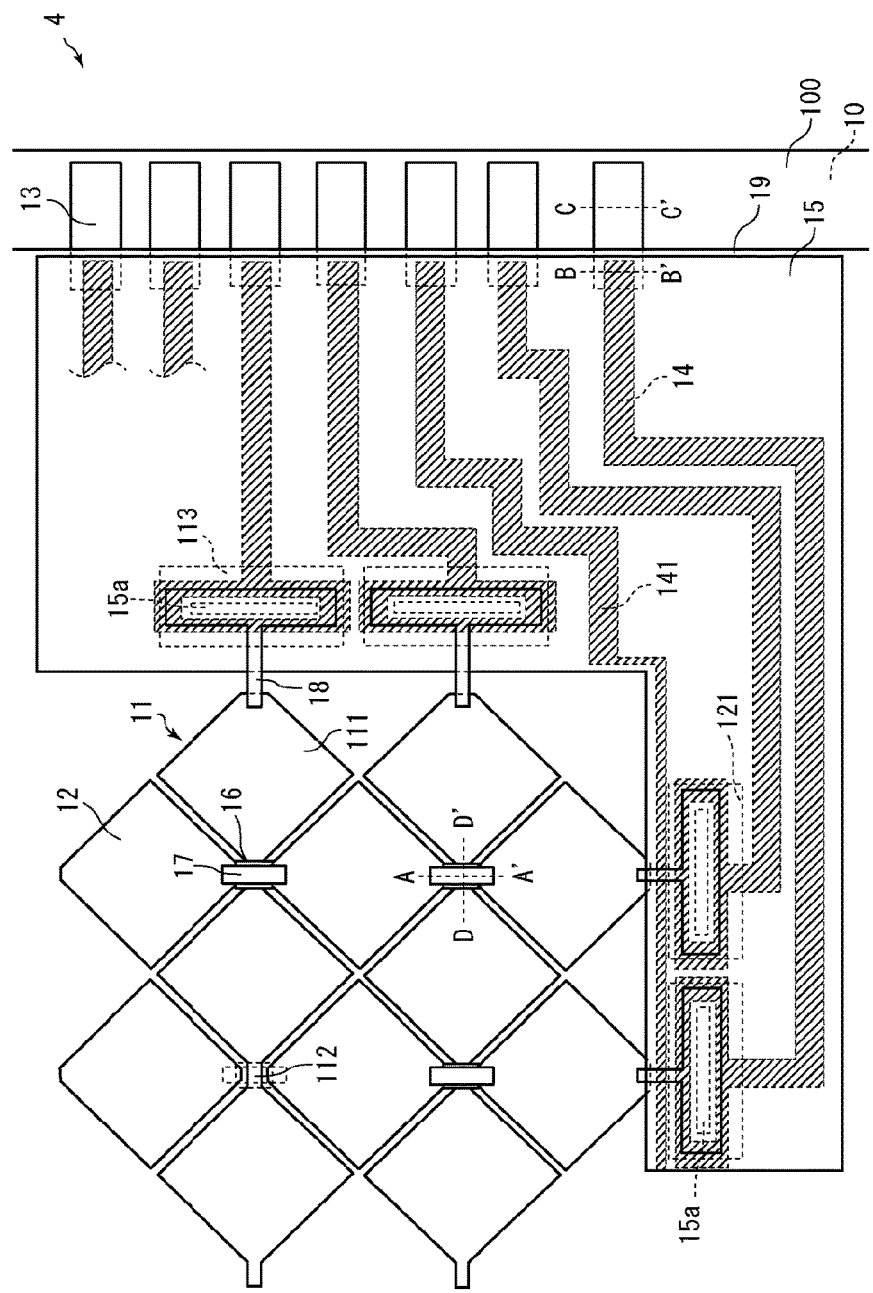
FIG. 17 is a plan view that schematically shows a touch panel configuration according to Embodiment 4 of the present invention.

FIG. 17 is a plan view that schematically shows a configuration of a touch panel 4 according to Embodiment 4 of the present invention. In FIG. 17, the wiring lines 14 and the ground wiring line 141 are depicted with a hatching pattern for ease of viewing.

The touch panel 4 includes an insulating substrate 10, first electrodes 11, second electrodes 12, lead-out electrodes 113 and 121, terminals 13, wiring lines 14, a ground wiring line 141, insulating films 15 and 16, bridges 17 and 18, a protective film 19, and a reflectance adjusting layer 100. That is, the touch panel 4, in addition to what is included in the touch panel 1, includes a reflectance adjusting layer 100.

The reflectance adjusting layer 100 is formed over the entire surface of the insulating substrate 10. The reflectance adjusting layer 100 if formed closer to the insulating substrate 10 than the first electrodes 11, second electrodes 12, and terminals 13.

Figure 18A:
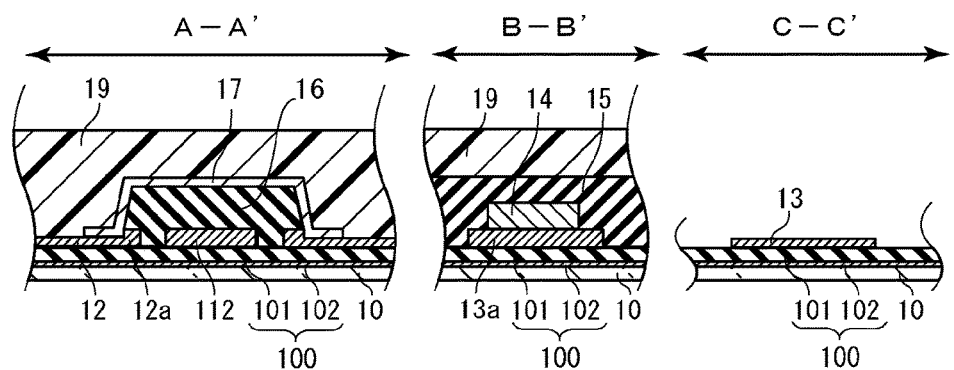
FIG. 18A shows cross-sectional views of FIG. 17 along the lines A-A', B-B', and C-C'.
Figure 18B:
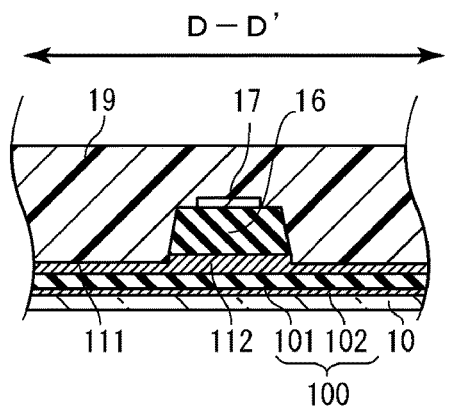
FIG. 18B is a cross-sectional view of FIG. 17 along the line D-D'.

FIG. 18A shows cross-sectional views of FIG. 17 along the lines A-A', B-B', and C-C'. FIG. 18B is a cross-sectional view of FIG. 17 along the line D-D'.

The reflectance adjusting layer 100 has a layered structure in which base layers 101 and 102 are layered in this order from the insulating substrate 10. The base layers 101 and 102 are insulating films made of materials with different indices of refraction.

The base layers 101 and 102 have indices of refraction and thickness adjusted such that the difference in reflectance is diminished between the portions where either the first electrodes 11 or second electrodes 12 are formed, and portions where both the first electrodes 11 and second electrodes 12 are formed.

Light reflects off of a boundary between mediums having different refractive indices when passing therethrough. Some of the light entering where the first electrodes 11 are formed is reflected at the boundary between the protective film 19 and the first electrodes 11, for example. Some of the light passing through this boundary is reflected at the boundary between the first electrodes 11 and the base layer 102. These two beams of reflected light reinforce each other or cancel each other out depending on the phase difference therebetween.

On the other hand, some of the light entering where the first electrodes 11 are not formed is reflected at the boundary between the protective film 19 and the base layer 102, for example. Some of the light passing through this boundary is reflected at the boundary between the base layer 102 and the base layer 101. These two beams of reflected light reinforce each other or cancel each other out depending on the phase difference therebetween.

Thus, if the base layers 101 and 102 are adjusted such that the reflectance of light entering where the first electrodes 11 are formed is equal to the reflectance of light entering where the first electrodes 11 are not formed, the electrode patterns can be made difficult to see.

<Manufacturing Method for Touch Panel 4>

The base layer 101 is formed by CVD, for example, over the entire surface of the insulating substrate 10. The base layer 101 is SiN, for example, and the index of refraction is 1.72 to 1.98. The thickness of the base layer 101 is 3 nm to 9 nm, for example.

Next, the base layer 102 is formed by CVD, for example, so as to cover the entire surface of the base layer 101. The base layer 102 is SiO or SiON, for example, and the index of refraction is 1.41 to 1.68. The thickness of the base layer 102 is 30 nm to 150 nm, for example.

The steps after forming the base layer 101 and base layer 102 are the same as those of Embodiment 1.

According to the present embodiment, the difference in reflectance between portions where the first electrodes 11 or second electrodes 12 are formed and portions where neither the first electrodes 11 nor the second electrodes 12 are formed is adjusted by the reflectance adjusting layer 100. Thus, the electrode patterns become more difficult to see.

<Other Embodiments>

The embodiments of the present invention were described above, but the present invention is not limited to the embodiments above, and various modifications are possible within the scope of the present invention. Also, the embodiments above can be appropriately combined.

For example, the touch panel 2 according to Embodiment 2 and the touch panel 3 of Embodiment 3 may include the reflectance adjusting layer 100.

Industrial Applicability

The present invention can be applied to the industry of capacitive touch panels.

The invention claimed is:

1. A touch panel, comprising:
   an insulating substrate;
   a first electrode extending in one direction and including first electrode sections and a connecting portion that connects adjacent said first electrode sections, the first electrode being formed on the insulating substrate;
   a second electrode formed on the insulating substrate and extending in a direction that intersects with the first electrode, the second electrode including second electrode sections; and
   an insulating film that covers the connecting portion of the first electrode and a portion of each of adjacent said second electrode sections of the second electrode,
   wherein the first electrode including the first electrode sections and the connecting portion and the second electrode sections of the second electrode are all made of a same material in a same layer,
   wherein the second electrode has a bridge connecting adjacent said second electrode sections over the insulating film, the bridge of the second electrode thereby being formed in a layer above the layer in which the second electrode sections of the second electrode are formed, and
   wherein any portions of the first and second electrodes that are formed of said same material in said same layer and that are covered by the insulating film are greater in thickness, as measured in a direction normal to a surface of the insulating substrate, than other portions of the first and second electrodes that are formed of said same material in said same layer and that are not covered by the insulating film.

2. The touch panel according to claim 1, wherein the insulating film also covers at least either of respective portions of the first electrode sections and respective portions of the second electrode sections.

3. The touch panel according to claim 1, further comprising:
   terminals formed on the insulating substrate; and
   wiring lines connecting the first and second electrodes to the terminals, wherein the terminals have portions of differing thicknesses.

4. The touch panel according to claim 3, wherein portions of the terminals respectively in contact with the wiring lines are greater in thickness than portions not in contact with the wiring lines.

5. The touch panel according to claim 3, wherein the first and second electrodes are made of the same material as the terminals.

6. The touch panel according to claim 3, wherein the first and second electrodes are made of a material selected from among a group including indium tin oxide and indium zinc oxide.

7. The touch panel according to claim 3, further comprising a reflectance adjusting layer formed on the insulating substrate and including two or more layered insulating films of differing indices of refraction.

* * * * *